United States Patent
Tamura et al.

(10) Patent No.: US 6,303,037 B1
(45) Date of Patent: Oct. 16, 2001

(54) REVERSE OSMOSIS PROCESS AND EQUIPMENT

(75) Inventors: Makio Tamura, Matsudo; Akitoshi Shinbo, Wako, both of (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 08/355,931

(22) Filed: Dec. 14, 1994

(30) Foreign Application Priority Data

Dec. 16, 1993 (JP) .................................................. 5-315708

(51) Int. Cl.⁷ .................................................. B01D 61/00
(52) U.S. Cl. .................... 210/652; 210/651; 210/257.2; 210/195.2; 210/739; 210/743; 210/900; 210/638
(58) Field of Search ...................... 210/651, 652, 210/641, 638, 639, 85, 257.2, 195.1, 902, 900, 739, 743, 195.2

(56) References Cited

U.S. PATENT DOCUMENTS

| | | | |
|---|---|---|---|
| 4,176,057 | * 11/1979 | Wheatley et al. | ................... 210/652 |
| 5,182,019 | * 1/1993 | Cote et al. | ......................... 210/321.8 |
| 5,238,574 | * 8/1993 | Kawashima et al. | ................. 210/652 |
| 5,316,637 | * 5/1994 | Ganzi et al. | ....................... 204/182.4 |

FOREIGN PATENT DOCUMENTS

| | | | |
|---|---|---|---|
| 091287 | * 4/1987 | (JP) | ..................................... 210/652 |
| 180793 | * 8/1987 | (JP) | ..................................... 210/652 |
| 141694 | * 6/1988 | (JP) | ..................................... 210/900 |

OTHER PUBLICATIONS

Jacob I. Bregman, Envronmental Science & Technology, pp. 297–302, vol. 4, No. 4, Apr. 1970.*
Water Treatment Handbook, 5gh Edition, Degremont, 1979, cover page/copyright page/pp. 355–357.

* cited by examiner

*Primary Examiner*—Ana Fortuna
(74) *Attorney, Agent, or Firm*—Norris McLaughlin & Marcus

(57) ABSTRACT

A reverse osmosis treatment of feed water containing at least silica and hardness ions for separating the feed water into permeate water and concentrate is effected while maintaining the pH of the concentrate at a level of at most 6. According to the foregoing process, silica can be prevented from precipitating, and a high recovery of permeate water can be secured.

4 Claims, 5 Drawing Sheets

REVERSE OSMOSIS PROCESS AND EQUIPMENT

BACKGROUND OF THE INVENTION

1. Field of the Invention

The present invention relates to reverse osmosis process and equipment which are suitable for production of high-purity water for use in semiconductor and pharmaceutical industries, etc.

2. Related Art

After a pretreatment of industrial water or city water, such as coagulation and filtration, membrane filtration, activated carbon filtration, or decarbonation treatment thereof, a reverse osmosis treatment of the pretreated water has heretofore been effected using reverse osmosis equipment to produce high-purity water. A further treatment of permeate water resulting from permeation of the pretreated water through a reverse osmosis membrane in the reverse osmosis equipment has also heretofore been effected using ion exchange equipment, electrodeionization (EDI) deionized water production equipment, reverse osmosis equipment, or the like to produce higher-purity water.

Conventional reverse osmosis equipment is operated, or run, in such a state that the silica concentration of concentrate is equal to or lower than the solubility therein of silica. The reason for this is as follows. When the reverse osmosis equipment is run at a silica concentration of concentrate exceeding the solubility therein of silica, silica either alone or in chemical and/or physical combination with hardness ions [i.e., a hardness component(s)] such as calcium ions and/or magnesium ions, and/or other component(s) in the concentrate is precipitated along the flow path of the concentrate and on the surface of a reverse osmosis membrane to bring about a decrease in the flux of permeate water, an increase in pressure differential across the reverse osmosis membrane, etc. to thereby make the stable operation of the equipment difficult. Herein, the term "flux of permeate water" means the flow rate, per unit area of the reverse osmosis membrane, of permeate water flowed through the reverse osmosis membrane.

Additionally stated, the solubility of silica can be found, for example, using known data as shown on page 29 of "GYAKUSINTOHO-GENGAIROKAHO II OYO, MAKU RIYO GIJUTU HANDBOOD (REVERSE OSMOSIS-ULTRAFILTRATION II APPLICATION, HANDBOOK OF MEMBRANE UTILIZATION TECHNOLOGIES)" (published by Saiwai Shobo K. K. on Jun. 30, 1978). An example of such known data are shown in FIG. 1. Additionally stated, the values of the solubility of silica as shown in FIG. 1 are data on a system wherein silica alone is present in water. The values of the solubility of silica in the presence of hardness ions coexisting therewith are believed to be lower than those as shown in FIG. 1. Methods of lowering the silica concentration of concentrate to or below the solubility therein of silica include a method wherein the recovery of permeate water (amount of permeate water/amount of feed water) is controlled in such a way as to lower the silica concentration of concentrate to or below the solubility therein of silica. The silica concentration of industrial water as well as city water in Japan is around 20 ppm (as $SiO_2$, the same will apply hereinbelow) in most cases, where the upper limit of the recovery of permeate water is 75 to 80% and concentrate in an amount corresponding to 20 to 25% of feed water is therefore discarded. This is problematic from the standpoint of effective utilization of feed water.

Alternatively, a reverse osmosis membrane having a low rejection of silica of, e.g., at most 50% may be used to run the reverse osmosis process while maintaining the silica concentration of concentrate at or below the solubility therein of silica. In this case, although the recovery of permeate water can be increased, the silica concentration of the permeate water turns out to be comparatively high, thus sacrificing a high degree of purification of the permeate water, attainment of which is the primary purpose of reverse osmosis equipment.

Accordingly, an object of the present invention is to provide reverse osmosis process and equipment which are stably operable without precipitation of silica even if the silica concentration of concentrate exceeds the solubility therein of silica (this solubility being one which has heretofore been believed to prevail, hereinafter referred to as "standard solubility"), and are therefore operable at a high recovery of permeate water.

SUMMARY OF THE INVENTION

As a result of extensive investigations with a view to solving the foregoing problems, the inventors of the present invention have unexpectedly found out that, when reverse osmosis equipment is operated while maintaining the pH of concentrate at a level of at most 6, no silica is precipitated along the flow path of the concentrate and on the surface of a reverse osmosis membrane to enable a stable operation of the equipment even if the silica concentration of the concentrate exceeds the standard solubility therein of silica and even if silica coexists with concentrated hardness ions in the concentrate. The present invention has been completed based on this finding.

More specifically, in accordance with the present invention, there is provided a reverse osmosis process comprising treating feed water containing at least silica and hardness ions with a reverse osmosis membrane to separate the feed water into permeate water and concentrate, while maintaining the pH of the concentrate at a level of at most 6. The silica concentration of the concentrate may exceed the standard solubility therein of silica.

In accordance with the present invention, there also is provided a reverse osmosis process comprising treating feed water containing at least silica and hardness ions with a first reverse osmosis membrane to separate the feed water into first permeate water and first concentrate; and treating the first concentrate with a second reverse osmosis membrane to separate the first concentrate into second permeate water and second concentrate, while maintaining the pH of the second concentrate at a level of at most 6. The silica concentration of the second concentrate may exceed the standard solubility therein of silica.

In accordance with the present invention, there is further provided reverse osmosis equipment comprising at least one reverse osmosis membrane module having a reverse osmosis membrane for treating therewith feed water containing at least silica and hardness ions to separate the feed water into permeate water and concentrate; a feed water pumping means for pumping the feed water into said at least one reverse osmosis membrane module; a pH sensing means for measuring the pH of the concentrate; and a pH control means having a built-in feedback control system for controlling the pH of the feed water through feedback of the pH value of the concentrate measured with the pH sensing means in such a way as to maintain the pH of the concentrate at a level of at most 6.

In accordance with the present invention, there is still further provided reverse osmosis equipment comprising at least one first reverse osmosis membrane module having a first reverse osmosis membrane for treating therewith feed water containing at least silica and hardness ions to separate the feed water into first permeate water and first concentrate; at least one second reverse osmosis membrane module having a second reverse osmosis membrane for treating therewith the first concentrate to separate the first concentrate into second permeate water and second concentrate; a feed water pumping means for pumping the feed water into said at least one first reverse osmosis membrane module;. a pH sensing means for measuring the pH of the second concentrate; and a pH control means having a built-in feedback control system for controlling the pH of the feed water or the first concentrate through feedback of the pH value of the second concentrate measured with the pH sensing means in such a way as to maintain the pH of the second concentrate at a level of at most 6.

The present invention will now be described in detail.

In the present invention, the feed water may be a variety of water containing silica and hardness ions, specific examples of which include industrial water, city water, and well water.

Additionally stated, it is preferable that the feed water such as industrial water be preliminarily subjected to a pretreatment such as coagulation and filtration, membrane filtration, activated carbon filtration, or decarbonation treatment.

The hardness ions may be those generally so called, examples of which include Ca ions, Mg ions, Fe ions, etc., which may be either alone or in mixture.

In the first-mentioned reverse osmosis process of the present invention, the pH of the feed water is controlled in such a way that the pH of the concentrate (hereinafter referred to simply as the "concentrate" in this case) resulting from the reverse osmosis treatment of the feed water can be maintained at a level of at most 6, especially preferably 4.0 to 5.5. On the other hand, in the second-mentioned reverse osmosis process of the present invention, the pH of the feed water or the first concentrate, preferably the first concentrate, is controlled in such a way that the pH of the second concentrate resulting from the reverse osmosis treatment of the first concentrate can be maintained at a level of at most 6, especially preferably 4.0 to 5.5. In the first- and second-mentioned reverse osmosis processes of the present invention, the pH of the feed water or the first concentrate may conveniently be controlled by addition thereto of an acid, with an electrodialysis unit using a cation exchange resin or ion exchange membranes, with a diaphragm electrolyzer, or the like to thereby maintain the pH of the concentrate or the second concentrate at a level of at most 6. Preferable examples of the above-mentioned acid include hydrochloric acid, sulfuric acid, and carbonic acid (carbon dioxide gas). The pH of the concentrate or the second concentrate may be controlled according to a known method, an example of which is a method wherein the measured value of the pH of the concentrate or the second concentrate is fed back to control the pH of the feed water or the first concentrate. The pH of the concentrate or the second concentrate sometimes fluctuates because of a fluctuation in the pH of the feed water, and/or the like. In this case, the maximum value of the pH of the concentrate or the second concentrate is preferably controlled to at most 6. Additionally stated, the reason why the pH of the concentrate or the second concentrate, not the pH of the feed water, is evaluated is that precipitation of silica and the like occurs in the concentrate or the second concentrate, not in the feed water.

Although any kind of reverse osmosis membrane can be used, a synthetic polyamide reverse osmosis membrane excellent in separation performance on the acidic side is preferred as the reverse osmosis membrane for the first-mentioned reverse osmosis process and equipment and as the second reverse osmosis membrane in particular for the second-mentioned reverse osmosis process and equipment.

The foregoing processes and equipment of the present invention can be stably operated, or run, without precipitation of silica and the like along the flow path of the concentrate (the first concentrate and the second concentrate in the case of the second-mentioned reverse osmosis process and equipment) and on the surface(s) of the reverse osmosis membrane(s) even if they are run at a silica concentration of the concentrate or the second concentrate in excess of the standard solubility therein of silica.

BREIF DESCRIPTION OF THE DRAWINGS

The foregoing and other objects, features and advantages of the present invention will be better understood from the following description taken in connection with the accompanying drawings, in which.

BEST MODES FOR CARRYING OUT THE INVENTION

The following Examples will illustrate the present invention in more detail, but should not be construed as limiting the scope of the invention.

EXAMPLE 1

Figure 2:
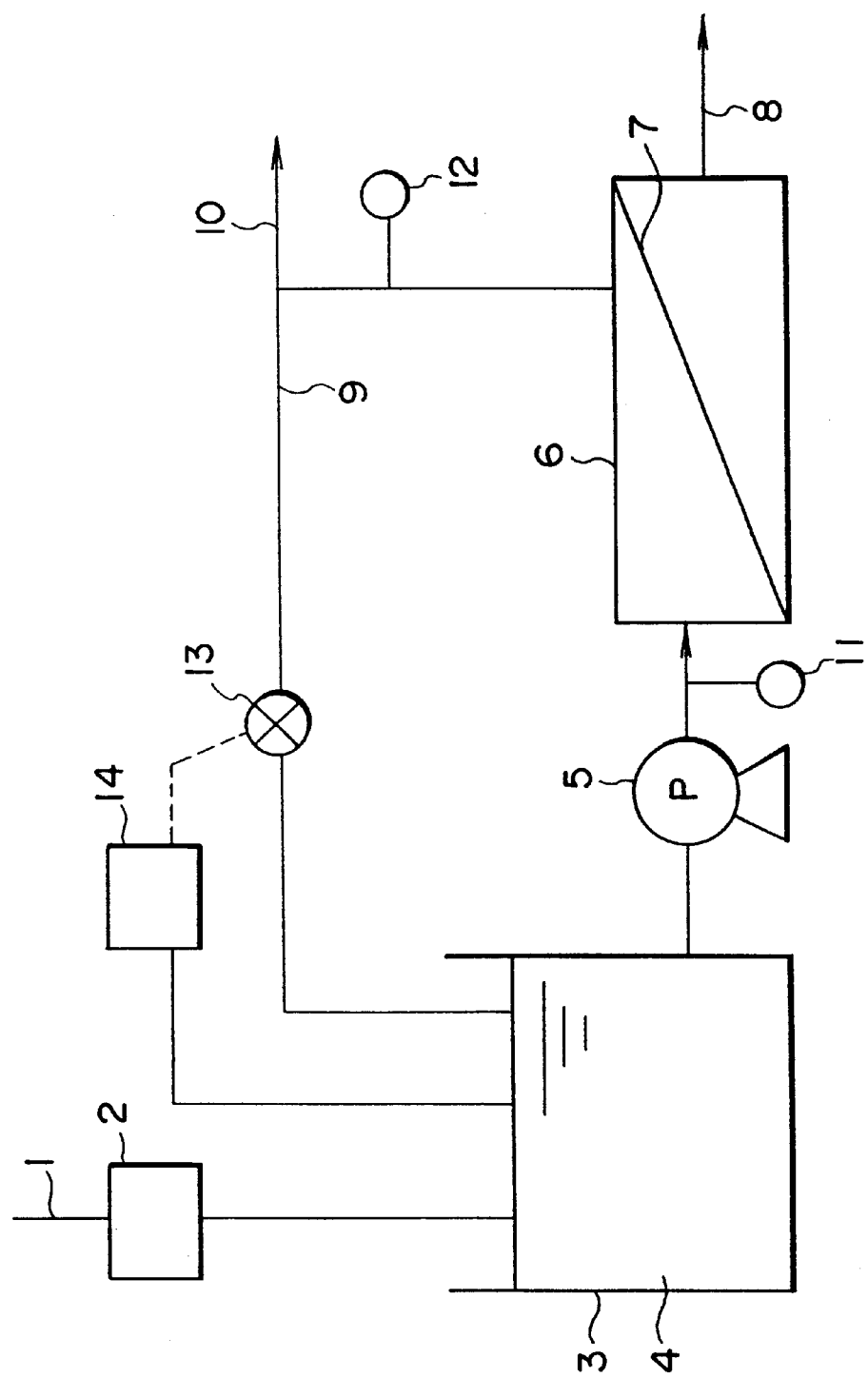
FIG. 2 is a flow diagram showing an example of the first-mentioned reverse osmosis equipment of the present invention that may be used in carrying out the first-mentioned reverse osmosis process of the present invention.

FIG. 2 is a flow diagram showing an example of reverse osmosis equipment, which will be described below. In FIG. 2, feed water (e.g., city water) passed through an inflow piping 1 is flowed into and passed through an activated carbon filter 2, and then flowed into a feed water tank 3. The feed water 4 in the tank 3 is then flowed into a reverse osmosis membrane module 6 by the action of a high-pressure pump 5. In the reverse osmosis membrane module 6, a reverse osmosis treatment of the feed water 4 is effected to separate the feed water 4 into permeate water allowed to permeate through a reverse osmosis membrane 7 and thereby decreased in the concentrations of silica and the like, and concentrate not allowed to permeate through the reverse osmosis membrane 7 and hence increased in the concentrations of silica, hardness ions, and the like.

The permeate water is then flowed out of the system, or equipment, via a withdrawal piping 8. On the other hand, part of the concentrate is flowed back into the feed water tank 3 via a circulating piping 9, while the other part of the concentrate is flowed out of the system via a branch piping 10.

A feed water pressure gauge 11 is positioned on a pipe between the high-pressure pump 5 and the reverse osmosis membrane module 6. A concentrate pressure gauge 12 is positioned in the circulating piping 9 between the reverse osmosis membrane module 6 and the branch piping 10. A pH sensor 13 is positioned in the circulating piping 9 between the branch piping 10 and the feed water tank 3, and is interlocked with a chemicals feed pump 14. The flow rate of hydrochloric acid pumped out from the chemicals feed pump 14 is controlled on the basis of the pH value of the concentrate measured with the pH sensor 13. According to the foregoing control, hydrochloric acid is added, or fed, to the feed water tank 3 in such a way as to keep the pH of the concentrate at a level of about 4.5. The foregoing control is of a feedback system. The reverse osmosis membrane 7 is NTR 759 (rejection of silica: about 99%) manufactured by NITTO DENKO CORPORATION.

A reverse osmosis treatment of city water (pretreated with the activated carbon filter 2) was continuously effected at a water temperature of 20° C. while using the foregoing reverse osmosis equipment as shown in the flow diagram of FIG. 2.

Figure 1:
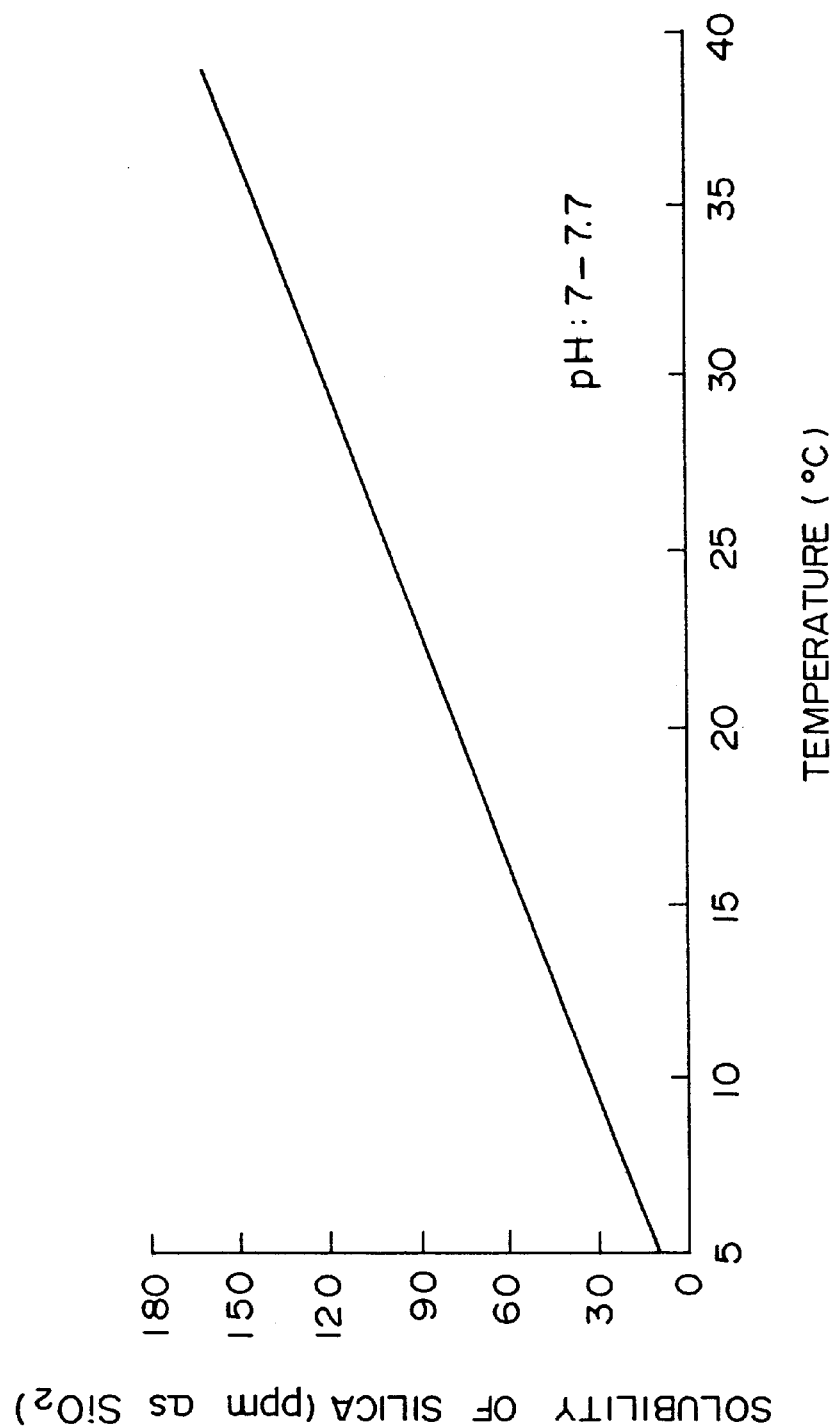
FIG. 1 is a graph showing the relationship between the solubility of silica in water and the temperature of water.

The feeding pressure of the feed water 4 into the reverse osmosis membrane module 6 was kept constant at 10 kgf/cm.$^2$ Additionally stated, since the silica concentration of city water was so low that the silica concentration of the concentrate did not exceed the standard solubility therein of silica, part of the concentrate was drained out of the system via the branch piping 10, and the rest of the concentrate was returned to the feed water tank 3 via the circulating piping 9 to increase the silica concentration of the feed water. As a result, the silica concentration of the concentrate became 200 to 300 ppm which was higher than the standard solubility of silica in water as can bee seen in FIG. 1, and the hardness ion concentration of the concentrate became 500 to 620 ppm. Additionally stated, the concentration rate was set by keeping constant the proportion of the flow rate of the permeate water withdrawn out of the system to the flow rate of the concentrate drained out of the system via the branch piping 10 (flow rate of permeate water : flow rate of concentrate =9:1). The foregoing manipulation made the concentration rate 10-fold.

Figure 3:
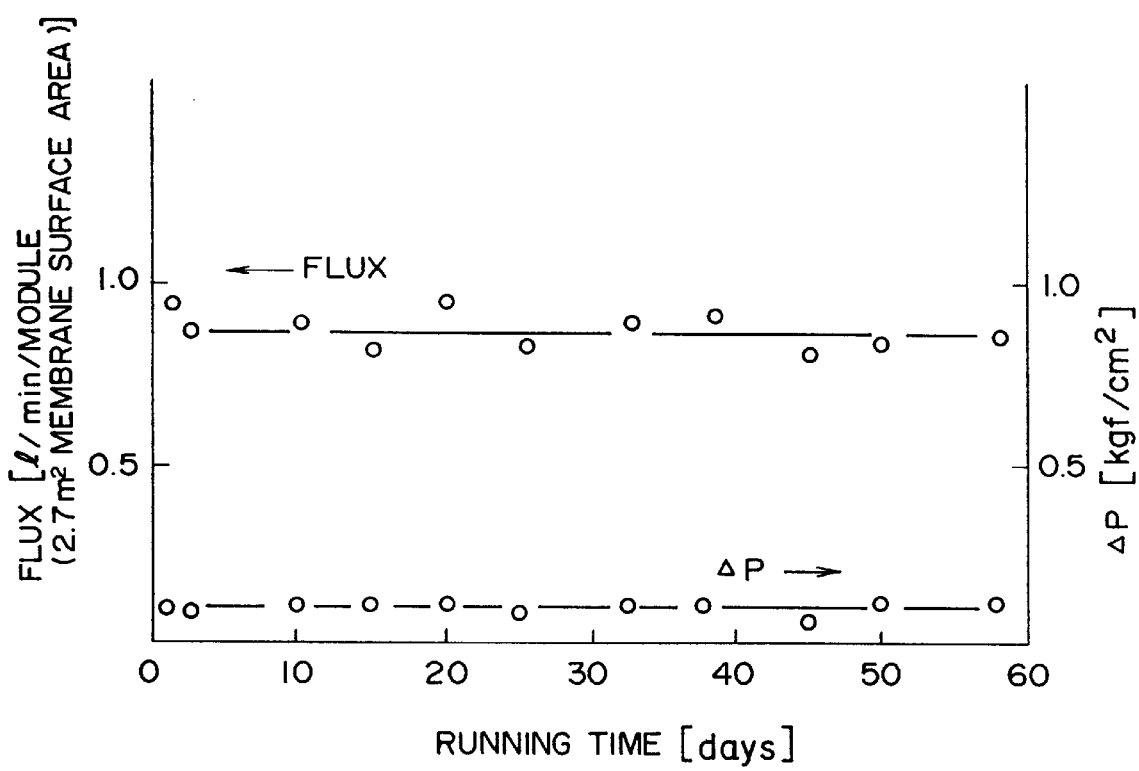
FIG. 3 is a graph showing the relationship between the flux of permeate water as well as the pressure differential ($\Delta P$) across a reverse osmosis membrane module and the running time in Example 1 according to the present invention, wherein use was made of the reverse osmosis equipment of FIG. 2.

The results are shown in FIG. 3. As is apparent from FIG. 3, no changes in the flux of permeate water and the pressure differential (ΔP) across the reverse osmosis membrane module 6 were recognized even when the equipment was continuously run for 60 days. This demonstrates that no silica was deposited on the surface of the reverse osmosis membrane 7 in the module 6 even though the silica concentration of the concentrate exceeded the standard solubility therein of silica.

Additionally stated, the pressure differential (ΔP) across the reverse osmosis membrane module 6 is defined by the formula: "feeding pressure of feed water−pressure of concentrate", and specifically is a pressure difference in reading between the feed water pressure gauge 11 and the concentrate pressure gauge 12.

Although one reverse osmosis membrane module was used in the foregoing Example, the number of reverse osmosis membrane module(s) is not necessarily limited to one, and may be 2, 3, or more instead. Likewise, Example 1 represents a one-stage reverse osmosis system but the reverse osmosis process and equipment in accordance with the present invention can be adapted to any other arrangement of modules (two-stage, three-stage, etc.).

EXAMPLE 2

Figure 6:
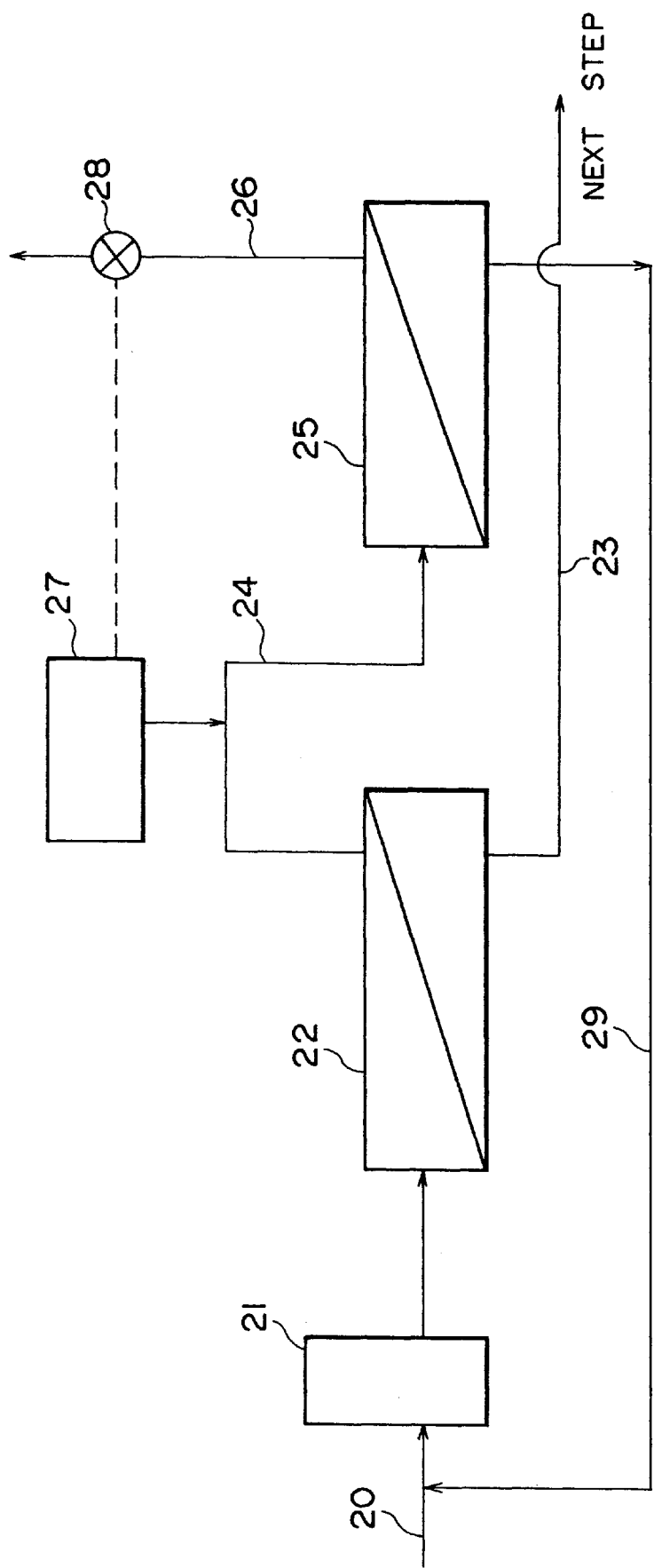
FIG. 6 is a flow diagram showing an example of the second-mentioned reverse osmosis equipment of the present invention that may be used in carrying out the second-mentioned reverse osmosis process of the present invention.

FIG. 6 shows another example of reverse osmosis equipment (two-stage), which will be described below. In FIG. 6, feed water passed through an inflow piping 20 is flowed into a pretreatment unit 21, wherein the feed water is then appropriately pretreated. Thereafter, the pretreated feed water is pumped with a high-pressure pump not shown in FIG. 6 to be flowed into a first reverse osmosis membrane module(s) 22, wherein a reverse osmosis treatment of the pretreated feed water is effected. First permeate water flowed out of the first reverse osmosis membrane module(s) 22 is passed through a first permeate water withdrawal piping 23 to be sent to a next step. On the other hand, first concentrate flowed out of the first reverse osmosis membrane module(s) 22 is passed through a first concentrate withdrawal piping 24 and flowed into a second reverse osmosis membrane module(s) 25, wherein a reverse osmosis treatment of the first concentrate is effected. Before the first concentrate is flowed into the second reverse osmosis membrane module(s) 25, an acid is added, or fed, to the first concentrate by means of a chemicals feed pump 27 in such a way that the pH of second concentrate flowed out of the second reverse osmosis membrane module(s) 25 becomes at most 6.

A pH sensor 28 is provided midway of a second concentrate withdrawal piping 26, and is interlocked with the chemicals feed pump 27.

Second permeate water flowed out of the second reverse osmosis membrane module(s) 25 is passed through a return piping 29, and flowed into the inflow piping 20, wherein it is combined with the feed water.

In the foregoing Example 2, the acid added to the first concentrate hardly permeates through a reverse osmosis membrane, while an M-alkalinity component usually exists in the feed water. Thus, the second permeate water flowed into the feed water via the return piping 29 does not make the feed water highly acidic. This enables substantially neutral water having a pH close to 7 to be fed as the feed water into the first reverse osmosis membrane module 22. In general, the separation performance of a reverse osmosis membrane is lowered on the acidic side. According to the foregoing Example 2, however, the first reverse osmosis membrane module(s) 22 may not be operated on the acidic side to favorably enable the separation performance of the first reverse osmosis membrane module(s) 22 to be maintained at a high level. Furthermore, since the second permeate water flowed out of the second reverse osmosis membrane module(s) 25 and lowered in the concentrations of silica and other impurity ions is returned to the feed water to improve the water quality of the feed water, the first permeate water flowed out of the first reverse osmosis membrane module(s) 22 is improved in water quality. On the other hand, the second reverse osmosis membrane module(s) 25 can be operated under such conditions that the silica concentration of the second concentrate flowed out of the second reverse osmosis membrane module(s) 25 is in excess of the standard solubility therein of silica, i.e., under such conditions as to provide a high recovery of second permeate water (amount of second permeate water/amount of first concentrate). Accordingly, the overall recovery of permeate water on the basis of the entire system is enhanced.

Additionally stated, the second permeate water may alternatively be combined with the first permeate water flowed out of the first reverse osmosis membrane module(s) in some cases instead of being returned to the feed water which is yet to be flowed into the first reverse osmosis membrane module (s), and the combined water may be then fed to the next step. In this case as well, the recovery of permeate water (first permeate water+second permeate water in this case) on the basis of the entire system is of course enhanced.

COMPARATIVE EXAMPLE 1

Figure 4:
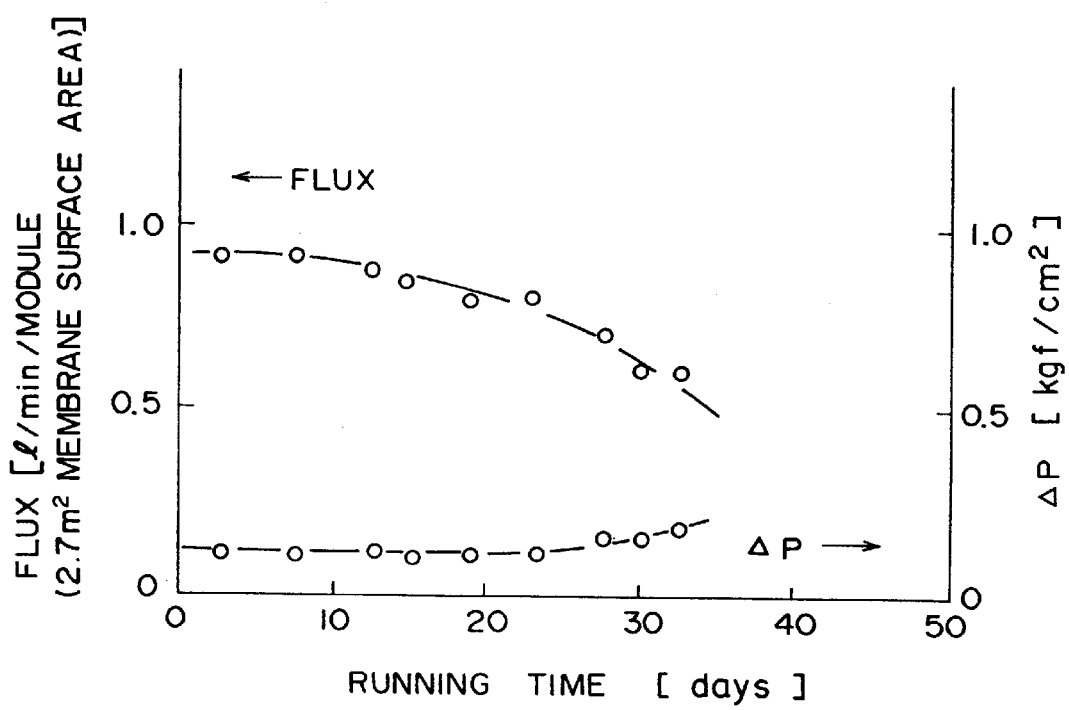
FIG. 4 is a graph showing the relationship between the flux of permeate water as well as the pressure differential ($\Delta P$) across a reverse osmosis membrane module and the running time in Comparative Example 1.

Substantially the same reverse osmosis treatment of city water (pretreated with the activated carbon filter 2) as in Example 1 was repeated except that the pH of the concentrate was set at 6.7. The results are shown in FIG. 4. In contrast to the results of Example 1, both of the flux of permeate water and the pressure differential ($\Delta P$) across the reverse osmosis membrane module 6 greatly fluctuated, and deposits were observed on the reverse osmosis membrane 7.

After the operation of the reverse osmosis equipment was terminated, the reverse osmosis membrane module 6 was dismantled, and the components of the deposits were analyzed to find out that silica and hardness ions accounted for the majority of the composition of the deposits.

INVESTIGATIVE EXAMPLE 1

The reverse osmosis equipment as used in Example 1 was run in substantially the same manner as in Example 1 for 20 days except that the pH of concentrate was varied. The flux of permeate water was measured on 20th day.

Figure 5:
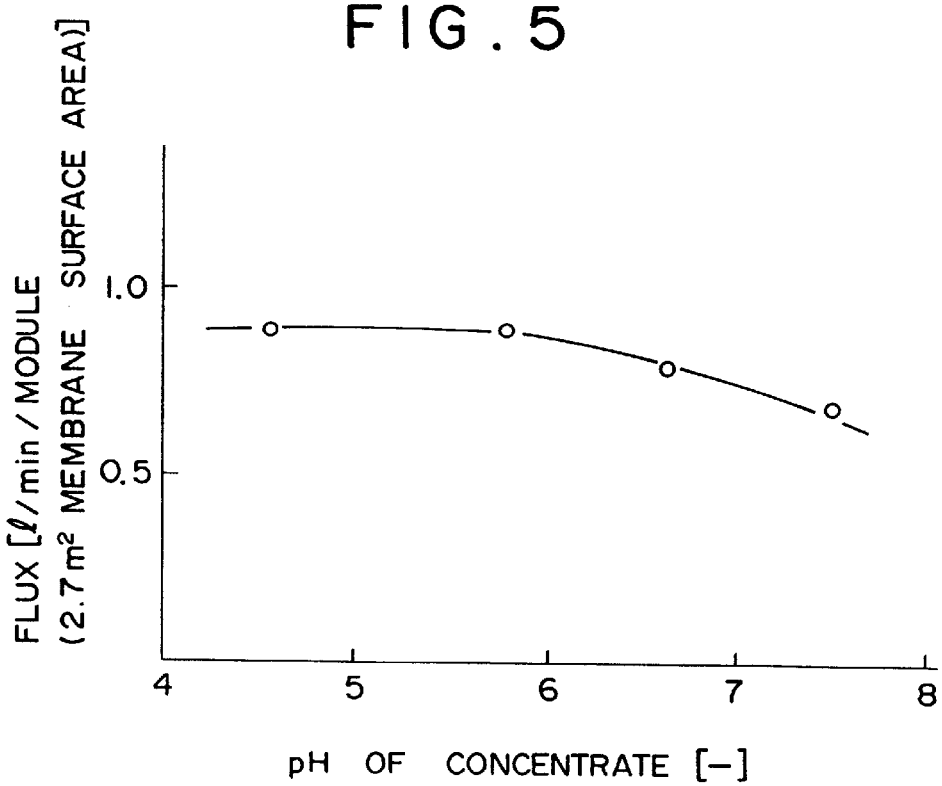
FIG. 5 is a graph showing the relationship between the pH of concentrate and the flux of permeate water in Investigative Example 1.

The results are shown in FIG. 5. As is apparent from FIG. 5, no substantial decrease in the flux of permeate water was observed when the pH of the concentrate was at most 6. By contrast, a notable decrease in the flux of permeate water was observed when the pH of the concentrate exceeded 6.

According to the present invention, feed water containing both silica and hardness ions can be treated with a reverse osmosis membrane having a high rejection of silica at a high recovery of permeate water while preventing silica from precipitating. As a result, permeate water having a low silica concentration can be obtained with a decrease in the amount of concentrate discarded to enable effective utilization of the feed water. Furthermore, when the permeate water is further treated with ion exchange equipment, additional reverse osmosis equipment, EDI deionized water production equipment, or the like, the load of such equipment can be decreased.

What is claimed is:

1. A reverse osmosis process comprising treating feed water containing at least silica and hardness ions, and selected from the group consisting of industrial water, city water, and well water, optionally pretreated, with a reverse osmosis membrane to separate said feed water into permeate water and concentrate, while maintaining the pH of said concentrate at a level of at most 6 and maintaining the silica concentration of said concentrate above the line connecting 12 ppm at 5° C. and 170 ppm at 40° C.

2. A reverse osmosis process comprising treating feed water containing at least silica and hardness ions, and selected from the group consisting of industrial water, city water, and well water, optionally pretreated, with a first reverse osmosis membrane to separate said feed water into first permeate water and first concentrate; and treating said first concentrate with a second reverse osmosis membrane to separate said first concentrate into second permeate water and second concentrate, while maintaining the pH of said second concentrate at a level of at most 6 and maintaining the silica concentration of said concentrate above the line connecting 12 ppm at 5° C. and 170 ppm at 40° C.

3. Reverse osmosis equipment comprising at least one reverse osmosis membrane module having a reverse osmosis membrane for treating therewith feed water containing at least silica and hardness ions, and selected from the group consisting of industrial water, city water, and well water, optionally pretreated, to separate said feed water into permeate water and concentrate; a feed water pumping means for pumping said feed water into said at least one reverse osmosis membrane module; a pH sensing means for measuring the pH of said concentrate; and a pH control means having a built-in feedback control system for controlling the pH of said feed water through feedback of the pH value of said concentrate measured with said pH sensing means in such a way as to maintain the pH of said concentrate at a level of at most 6.

4. Reverse osmosis equipment comprising at least one first reverse osmosis membrane module having a first reverse osmosis membrane for treating therewith feed water containing at least silica and hardness ions, and selected from the group consisting of industrial water, city water, and well water, optionally pretreated, to separate said feed water into first permeate water and first concentrate; at least one second reverse osmosis membrane module having a reverse osmosis membrane for treating therewith said first concentrate to separate said first concentrate into second permeate water and second concentrate; a feed water pumping means for pumping said feed water into said at least one first reverse osmosis membrane module; a pH sensing means for measuring the pH of said second concentrate; and a pH control means having a built-in feedback control system for controlling the pH of said feed water or said first concentrate through feedback of the pH value of said second concentrate measured with said pH sensing means in such a way as to maintain the pH of said second concentrate at a level of at most 6.

* * * * *